Patented June 23, 1942

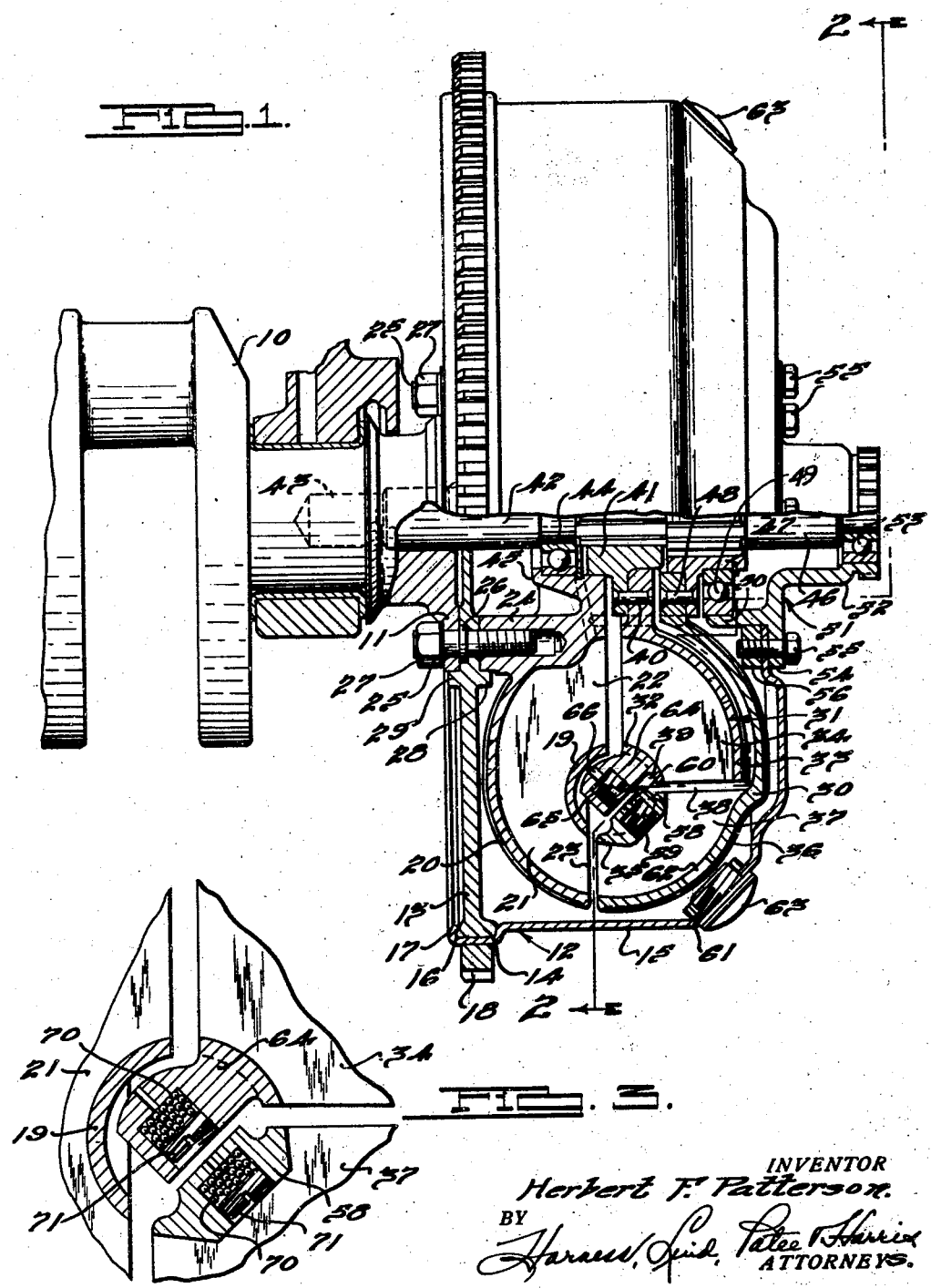

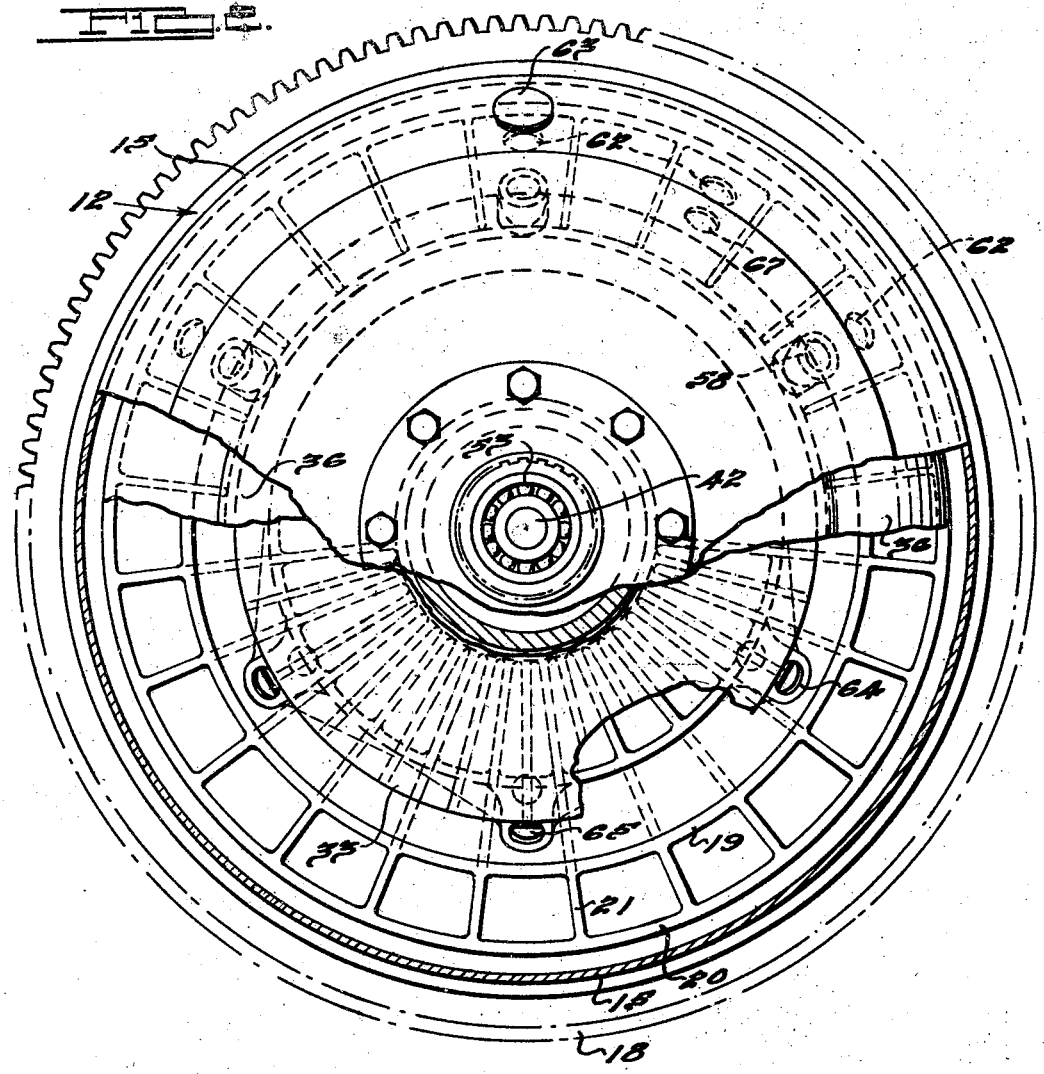

2,287,532

UNITED STATES PATENT OFFICE 2,287,532

FLUID COUPLING

Herbert F. Patterson, St. Clair Shores, Mich., assignor to Chrysler Corporation, Highland Park, Mich., a corporation of Delaware Application May 4, 1938, Serial No. 206,038

4 Claims. (Cl. 60—54)

This invention relates to a fluid coupling.

One of the objects of the invention is to provide improved means for balancing a fluid coupling and more particularly to provide balancing means which does not cause a reduction in the normal capacity of the working chamber for the fluid operating medium and which does not obstruct the normal flow of the latter in the working chamber.

Another object of the invention is to provide balancing means which may be adjusted either as to weight or position for satisfactorily balancing a fluid coupling.

A still further object of the invention is to provide balancing means of the above character for a fluid coupling of the multiple runner type and to so construct and arrange the coupling structure that the balancing means is rendered readily accessible both for replacement and adjustment purposes when the structure is in assembled position.

Another object of the invention is the provision of an improved fluid coupling characterized by simplicity of parts for effecting economies in manufacture and assembly while maintaining the weight of the structure at a minimum.

Other objects and advantages of the invention will be more apparent from the following description taken in connection with the accompanying drawings, in which:

Fig. 1 is a side elevational view, partly in section, of a fluid coupling embodying the invention.

Fig. 2 is an end view in elevation of the coupling shown in Fig. 1, parts being broken away and in section, the view being taken as indicated by the line 2—2 of Fig. 1.

Fig. 3 is a fragmentary view of a modified form of the balancing means shown in Fig. 1.

In the drawings the reference character 10 designates a power driving shaft, such as the crankshaft of the motor vehicle engine, having an annular radial flange 11 for connection with the combination flywheel and cover structure, generally indicated at 12. The latter structures includes a disc member 13 having an enlarged peripheral portion 14, and a cover casing 15 having a channel 16 receiving the peripheral portion 14 of the disc 13. The adjacent edge of the cover 15 is crimped as at 17 to engage the adjacent annular side face of the enlarged peripheral portion 14 of the disc. A starter ring gear 18 is secured to the outer surface of the channel 16 of casing 15, the gear 18 preferably being heated to a suitable temperature, slipped in place with respect to the cover, and permitted to cool. During cooling the gear contracts to engage the outer surface of a channel 16.

The fluid coupling includes an impeller structure comprising the inner and outer similarly dished cover members 19 and 20, respectively, between which extend the circumferentially spaced, radially arranged vanes 21. The spaces between adjacent vanes provide passages for a suitable fluid such as oil entering at 22 and curving outwardly around cover 19 for discharge at 23.

The impeller structure is drivingly attached to the disc 13 and for this purpose the member 20 is provided with a plurality of circumferentially spaced, axially extending bosses, one of which is shown at 24. The free end of the boss 24 abuts the adjacent side face of the disc 13 and the flange 11 of shaft 10, disc 13 and boss 24 are provided with aligned openings for receiving a securing bolt 25, the latter being threadedly engaged in the opening in the boss 24. The disc 13 has a counterbore receiving an annular shoulder 26 of bolt 25, the shoulder overlapping and abutting the inner side face of the disc adjacent the opening therein. In assembly the bolt 25 is threaded into the opening in the boss 24 for drawing the impeller structure into fixed position with respect to the disc 13, and for this purpose an auxiliary nut member having a suitable tool engaging surface may be threaded onto the outer end of the bolt. The bolt is then engaged in the opening in the flange 11 of the shaft 10 and the securing nut 27 applied. The impeller structure is centered with respect to the disc 13 by a flange 28 extended axially from the latter, while an oppositely extending flange 29 centers the disc 13 and its companion structure with respect to the shaft 10. In this arrangement the bolts 25 constitute a common means for drivingly securing the impeller structure to the flywheel and cover structure and for similarly securing the latter structure to the shaft 10.

The fluid medium delivered by the impeller structure at 23 passes successively to a plurality of segmental runner members consisting of a primary runner 30 and a secondary runner 31. While the secondary runner 31 is shown as disposed within the primary runner 30, it will be understood that the invention is equally applicable to other arrangements of the runners.

It will be understood, of course, that the invention is not to be limited to the multiple runner arrangement and may be embodied in its broader aspects in a coupling of the single runner type. The secondary runner 31 comprises inner and outer dished members 32 and 33, respectively, between which extend the circumferential spaced, radially arranged vanes 34. The primary or outer runner 30 comprises the inner and outer dished members 35 and 36, respectively, between which extend the circumferentially spaced, radially arranged vanes 37. During rotation of shaft 10 fluid is delivered at 23 from the impeller structure to the adjacent spaces in the primary runner 30 provided by the vanes 37 thereof and is in turn delivered at 38 to the adjacent spaces in the secondary runner 31 provided by the vanes 34 thereof. The operating fluid medium circulates during rotation of the shaft 10 around the annular vortex chamber indicated at 39 and bounded by the inner dished cover members 19, 32 and 35. The spaces provided by the circumferentially spaced, radially arranged vanes 21, 34 and 37 constitutes a working space or chamber for the fluid medium.

A coupling including a runner structure having a plurality of segments can be arranged in the manner set forth in my co-pending application Serial No. 171,162, filed October 26, 1937, now Patent No. 2,203,177 granted June 4, 1940, and reference is made thereto for a typical illustration of the manner in which the segmental runner elements can function in conjunction with associated mechanism.

The secondary runner segment 31 is suitably fixed, as by rivets 40 to a hub 41 drivingly secured to an intermediate driven shaft 42 piloted forwardly at 43 in the shaft 10. The shaft 42 extends rearwardly through a bearing 44 carried by wall 45 of impeller 20 and is rotatably journalled in a rearwardly extending shaft 46. The latter has drivingly secured thereto a hub 47 to which the primary or outer runner 30 is riveted as at 48 or otherwise suitably drivingly secured thereto. The hub 47 is journalled in a bearing 49 carried by the axially extending portion 50 of the hub 51 for the structure 12. An axially oppositely extending portion 52 of hub 51 supports a bearing 53 through which the shaft 46 extends. The hub 51 has a radially extending flange 54 to which the cover casing 15 is secured by a plurality of circumferentially spaced bolts 55, the latter passing through aligned apertures in flange 54, cover 15, and a ring member 56. The latter is secured to the inner face of the cover 15 and the openings therein are threaded to receive a bolt 55, as is indicated in the sectioned portion of Fig. 1.

It has been determined that an obstruction so disposed as to change the normal path of fluid results in power losses and therefore any protrusion in the fluid working chamber reduces the coupling efficiency. It is desirable, therefore, to properly balance the coupling without reducing its efficiency and with this in mind, the balancing means is illustrated in connection with the inner dished members 32 and 35 bounding the vortex chamber 39, and extend into the latter in unobstructing relation with respect to the normal path of the fluid medium.

The inner dished member 35 of the primary or outer runner member 30 is provided with a plurality of circumferentially spaced bosses 58 extending inwardly into the vortex chamber 39. As illustrated more particularly in Fig. 1, the boss 58 has a threaded opening therein leading from the outer face of the member 35 for receiving a balancing plug 59. The end wall of the opening has a port 60 communicating with the chamber 39 to accommodate displacement of fluid from the opening as the plug is inserted therein. The plug 59 has a groove in the outer face for receiving a tool and may be adjusted axially to the desired position for balancing purposes and maintained in fixed position of adjustment against unintended movement by deforming a portion of the outer end face into abnormal engagement with the threaded surface of the boss. This deforming, however, does not prevent removal of the plug when such action is desired. The coupling is preferably balanced after the parts thereof are in assembled position, as shown. Access to the bosses for inserting or adjusting the plugs 59 is had through either of the filler openings 61 in the cover casing 15 and a plurality of openings 62 in the dished member 36 of the primary or outer runner 31, it being understood that an opening 62 at all times registers with an opening in a boss inasmuch as the members 35 and 36 are connected by the vanes 37 and may be rotated as a unit into registering relation with the filler opening. The latter is closed by the cap 63.

In furthering the objects of the invention, I have provided means for balancing the secondary or inner runner member 31. The inner dished member 32 of the latter has a plurality of circumferentially spaced bosses 64 extending into the vortex chamber 39, each boss having a threaded opening for receiving a plug 65 in a manner similar to that illustrated and described in connection with the plug 59 for the primary runner 30. The end wall of the opening in the boss has a port 66 through which fluid is displaced as the plug is inserted therein. Access is had to the boss 64 for inserting or adjusting the plug 65 through one of the filler openings 61 and opening 62 in the outer dished member 36 of the runner 30, and an opening 67 in the inner dished member 35 of the primary runner 30. The opening 67 is shown in the unbroken part of Fig. 2, it being understood that a similar opening may be provided in a substantially, diametrically opposite portion of the member 35. It will be understood that while some of the openings 62 at all times register with the opening in a boss 58, other of the openings 62 are adapted to register at all times with an opening 67 in the member 35. To gain access to the boss 64 in the inner dished member 32 of the secondary or inner runner, it is necessary to bring the openings 62 and 67 which are at all times in registering relation into alignment with an opening 61 in the cover casing 15.

The balancing means illustrated in Fig. 3 consists of a plurality of pellets disposed in the openings in the bosses 58 and 64 of the primary and secondary runners 30 and 31, respectively. The pellets 70 are preferably lead but may be formed from other metals or compositions, if desired. A closure member 71 threadedly engages the walls of each of the openings for retaining the pellets therein. Access is had to the openings receiving the pellets in the manner described in connection with the form of the invention shown in Fig. 1, it being understood that the Fig. 3 embodiment is more expediently assembled or adjusted by rotatably moving the cover and runner structures to a position permitting the pellets to be dropped through the registering openings into the openings in the bosses.

I do not limit my invention, in the broader aspects thereof, to any particular combination and arrangement of parts such as shown and described for illustrative purposes since various modifications will be apparent from the teachings of my invention and scope thereof as defined in the appended claims.

What I claim is:

1. In a fluid coupling having a driving member and a pair of driven members, each of said members including annular inner and outer cover structures with circumferentially spaced vanes extending generally radially between its cover structures, the inner cover structures of said members forming an annular chamber about which the fluid is circulated, the inner cover structure of one of said driven members having a projection disposed in said annular chamber, and balancing means disposed in said annular chamber and carried by said projection, the inner cover structure of the other of said driven members having an opening therein registrable with said balancing means.

2. In a fluid coupling having driving and driven members, each of said members including annular inner and outer cover structures with circumferentially spaced vanes extending generally radially between its cover structures, the inner cover structures of said members forming an annular chamber about which the fluid is circulated, the inner cover structure of one of said members having a portion thereof extending into said annular chamber, and balancing means for said last mentioned member carried by said portion, the cover structures of the other of said members having registering openings therein whereby said balancing means is rendered accessible.

3. In a fluid coupling including an impeller structure and a plurality of runner structures, each of said structures including outer and inner members bounding respectively a working chamber within which the fluid medium circulates and a non-working chamber about which the latter circulates, and balancing means carried by the inner member of each of said runner structures and disposed substantially within said non-working chamber, the member of one of said runner structures having openings therein adapted to accommodate access to the balancing means carried by the other of said runner structures.

4. In a fluid coupling including an impeller structure and inner and outer runner structures, each of said structures including outer and inner members bounding respectively an outer chamber within which a fluid medium circulates and an inner chamber about which the latter circulates, balancing means carried by the inner member of each of said runner structures and extending into said inner chamber in substantially unobstructed relationship with respect to the path of circulation of the fluid medium in the first mentioned chamber, the inner and outer members of said outer runner structure having registering openings therein for accommodating access to the balancing means for the outer runner structure, said last mentioned inner and outer members having other registering openings circumferentially spaced from said first mentioned registering openings for accommodating access to the balancing means for said inner runner structure.

HERBERT F. PATTERSON.